United States Patent Office 3,796,607
Patented Mar. 12, 1974

3,796,607
PROCESS FOR MAKING ELECTRODE HAVING AN INTERNAL ELECTRODEPOSITED METAL MATRIX
Glenn R. Schaer and Elmer F. Stephan, Columbus, Ohio, assignors to The Gates Rubber Company, Denver, Colo.
No Drawing. Filed July 19, 1971, Ser. No. 164,025
Int. Cl. H01m 35/00
U.S. Cl. 136—19
16 Claims

ABSTRACT OF THE DISCLOSURE

An electrode mixture comprising active material and finely divided conductive material is firmly compacted upon a conductive support and then suspended in an electrolyte medium whose constituents dissolve a minor proportion of the available active material of the electrode. The final electrode is then formed by an in situ electrodepositing step in which a portion of the dissolved active material is deposited as a metal throughout the electrode shape to produce a conducting metal matrix enclosing the active material.

The electrode has excellent mechanical strength, conductivity and requires a relatively short processing time. Electrodes of nickel, manganese dioxide, silver, mercury and copper, for instance, may be made according to the invention.

BACKGROUND OF THE INVENTION

This invention relates to electrodes for electrolytic cells, such as primary and secondary electrochemical cells, and especially relates to positive electrodes of the compressed powder or pasted type which are further subjected to an electrolysis step. The novel process of the present invention for preparing such electrodes may be utilized to produce nickel, silver, manganese dioxide, copper, and mercury electrodes, for instance.

One of the most widely used nickel electrodes for nickel-cadmium and nickel-zinc alkaline electrochemical cells is the sintered type. This sintered electrode has proved to be a good electrode providing relatively good discharge capacities and excellent mechanical integrity. Such an electrode may be produced by a chemical process involving impregnating a porous sintered nickel plaque with nickel nitrate and chemically converting the nitrate to active hydroxide. The impregnation step must be repeated several times. The overall process requires a number of critical steps, time, expense, and precise control before a suitable electrode is completed.

In an attempt to significantly reduce the time required to produce nickel electrodes, investigators have developed a process by which a pasted nickel electrode is suspended in a nickel plating bath containing reducible nickel ions which are subsequently electroplated onto the nickel electrode. While this process has been generally successful, during the electrodeposition step the tendency has been for the nickel ions to preferentially deposit on the surface of the electrode rather than throughout its matrix. Conductivity and discharge capacity has suffered as a result. The state of the prior art is exemplified by U.S. Pats. 3,305,401 to Aulin, 3,317,347 to Coleman et al., and Canadian Pat. No. 862,273.

Among the objects of the invention are to overcome the drawbacks of the prior art and to provide an electrode of superior conductivity, good discharge capacity, cycle life and mechanical integrity.

SUMMARY OF THE INVENTION

Briefly described, the invention entails a process for the preparation of an electrode comprising a mixture of active material and finely divided conductive material affixed to a conductive support, the process including the steps of (1) firmly compacting the electrode mixture upon the conductive support to form a self supporting electrode shape; (2) suspending the electrode shape in an electrolyte medium whose constituents dissolve a minor proportion of the available active material of the electrode; and (3) electrodepositing at least a portion of the dissolved active material as a metal on and within the electrode shape to produce a conducting metal matrix. The invention is also directed to an electrode made according to such a process.

The rates of dissolution of active material and deposition of metal are coordinated to promote uniform deposition of metal encompassing and inter-connecting particles of the active mass with the conductive support. Such a coordinated rate also maximizes energy density and conductivity.

PREFERRED EMBODIMENTS OF THE INVENTION

(1) Components of the electrode mixture

Electrodes of the invention generally employ an electrolytically reducible active mass in a finely divided particulate form, such as finely divided powder or crystals. Although not narrowly critical, it is preferred that the active particulate mass have an average particle size in the range of about 0.01 to about 100 microns and more preferably from about 0.1 to about 50 microns. Any type of active mass may be employed which is capable of being incorporated into a pasted, compressed powder, or other type of positive electrode and further capable of being partially dissolved and electrodeposited to form a metal conductive matrix throughout the electrode. Illustrative examples of active masses useful according to the invention include oxygen compounds of nickel (e.g., nickel hydrate and nickel hydroxide), manganese oxides, silver oxides, mercuric oxides, copper oxides, and the like. This active mass may also advantageously be provided with a porous metallic coating for amplified contact such as described in the aforementioned U.S. Pat. No. 3,305,401, or more preferably provided with a porous carbonaceous coating of graphite, lamp black, carbon black or the like.

To provide an electrical conductive link between the active mass and conductive support (which may serve as the current collector), a conductive medium is mixed with the active mass to provide intimate electrical contact at a number of contact points on the active mass particles (or coated active mass particles). This conductive medium should possess good electrical conductivity and generally be in the form of a powder or fibers which will blend with the active mass. Examples of such substances include metallic powders, e.g., nickel and iron, graphite fibers, electrolytic iron and nickel, and the like. The active mass and admixed conductive medium may be blended into a powdered mixture and compressed upon a suitable conductive substrate or support.

This support is preferably a good conductor and also serves as the current collector, typical structures of which include the pocket plate, tube, cylinder, thin sheet or flat grid structure such as woven wire screen, perforated sheet metal, expanded mesh, and the like. The substrate or support may typically be made of iron, steel, nickel plated iron or steel, nickel, brass, silver, bronze, platinum, palladium or compatible alloys thereof.

In another embodiment of the invention, the electrode is of the pasted type. A polymeric or conductive binder material is blended with the mixture of active mass and conductive medium. A suitable vehicle is usually added, the mixture made pliant and then applied to the conductive support; the vehicle is later driven off. In both the pasted and pressed powder embodiments, it is often useful to incorporate minor amounts of an anti-polar mass to prevent gassing in the event of a polarity reversal, such as might occur if the cell were over-discharged.

(2) Compaction of the electrode mixture

In either of the compressed powder or pasted electrode embodiments, the electrode mixture is firmly compacted upon the conductive support for sufficient reduction of electrode porosity to prevent excessive dissolution of the active mass during the subsequent electrodeposition step. In the case of the compressed powder embodiment, the powder mixture comprising the active mass and conductive medium is compacted upon the conductive support to the desired pressure by rolling, pressing, or by other means. In the pasted electrode, once the vehicle has been driven off (such as by exposure to heat) and the electrode essentially made dry, the compaction step is employed.

The compaction pressure, while depending upon the type of electrode being processed, is preferably at least about 6000 p.s.i., and more preferably in the range of from about 10,000 p.s.i. up to the pressure required to reduce the porosity of the electrode shape to 10%. In the case of the nickel electrode, the range of pressures required to reduce the porosity of the electrode shape to about 15% is preferred. To obtain the preferred porosity for the nickel electrode, it is preferred that the pressure applied to the electrode compact be at least about 30 tons/in.$^2$ of electrode surface, and more preferably at least about 65 tons/in.$^2$ of electrode surface. The thus compacted electrode shape should be substantially self supporting for subsequent treatment according to the invention. The compaction enables the electrode to have enough cohesive forces to retain its shape and integrity and to resist shedding.

(3) Electrolyte medium

The compacted electrode shape is suspended in an electrolyte medium, the constituents of which dissolve a minor proportion (i.e. less than about 50%) the available active material of the electrode. The dissolved product (which contains the cation of the active materials preferably complexed with other species) is then available for electrolytic deposition throughout the interior and surface of the electrode.

The electrolyte medium contains a buffering compound and a complexing agent in solution, both of which may, in some instances, be supplied by the same compound. It is preferred to include an anion in solution to promote the complex ion formation. Selection of the particular constituents of the electrolyte medium and their concentration will permit a satisfactory rate of dissolution of the active material. Too low a rate of dissolution often results in gassing upon application of an electrolyzing current. Likewise, too high a rate of dissolution results in an excessive loss of active material with the consequential lowering of energy density of the finished electrode. With a suitable rate of dissolution, the electrolyzing current for deposition can be chosen so as to promote uniform deposition of metal which will encompass and interconnect the particles of active mass with the conductive support, and yet maintain good energy density.

The buffers of the present invention should resist change in hydrogen ion concentration by maintaining the pH of the solution preferably in the range from about 5.5 to about 12 and more preferably from about 8 to about 11, with a pH of at least about 9 being most preferred.

Among the preferred buffers include the weak bases, such as ammonium hydroxide, and salts of weak bases such as the borates, phosphates, carbonates, tartrates, citrates, and the like. Buffer solutions containing a weak base and its salts are also quite useful.

The complexing agent, according to the invention, will vary according to the type of electrode being manufactured. In case of the nickel electrode, for example, ammonium ion has the ability to complex with nickel ion to form the nickel ammoniate or ammonium nickelate ion which in turn is readily reducible by electrolysis to deposit or plate nickel metal as a conductive matrix or network. The ammonium ion may be provided by any suitable means, such as by addition of ammonium hydroxide or its salts. It is particularly preferred to employ an electrolyte medium comprising ammonium hydroxide as a buffering and complexing agent and an ammonium salt which acts as a complexing agent as well as a promoter for the complex ion formation reaction. Suitable anions of the ammonium salts for this purpose include the borates, phosphates, carbonates, chlorides, chlorates, perchlorates, cyanides, tartrates, benzoates, citrates, sulfides, sulfites, and the like. An electrolyte medium consisting of concentrated ammonium hydroxide and added ammonium bicarbonate has been found to be particularly effective in dissolving an effective amount of active mass for deposition. Certain of the anions, if present in high enough concentrations, may be harmful to the finished plate and should either be avoided or thoroughly washed from the electrode after use.

Compatible non-interfering additives to the electrolyte may also be employed, such as leveling or brightening agents.

(4) Electrodeposition

The compressed electrode shape is suspended in the electrolyte medium as a cathode. It is generally preferable to utilize pressure to restrain the powder in the electrode in place during electrodeposition. This latter pressure may be low, such as 500 p.s.i., as might be provided by a small screw clamp to hold all the components in position. A counter electrode is immersed in the electrolyte, the electrodes being connected to a source of electric current. Direct current or more preferably interrupted direct current is employed. By using pulsating direct current a high current may be employed to promote uniform deposition yet minimize gassing. Generally the current required to deposit the metal will consume the availabe reducible nickel ammoniate ion faster than the complex ion can be supplied by dissolution of the active nickel hydroxide powder. If a finely divided metal powder (e.g. nickel powder) is employed in the electrode mix, the depositing nickel metal obtained from the available reducible nickel complex ion will join together at least a portion of the metal powder to further enhance the extent of the conductive matrix.

Temperature during electrodeposition is not narrowly critically and may range within a wide spectrum of temperatures. Temperatures near room temperature are preferred, although temperatures varying substantially from room temperature are operable.

Since during electrodeposition a minor proportion of the active material is converted to the conductive metal matrix, the capacity of the electrode is necessarily reduced. To end up with a desired ratio of active material to conductive network (which includes the finely divided conductive powder of the electrode mixture) it is often desirable to employ an excess of active mass so that when this excess is consumed during electrolytic deposition, the active mass remaining will be present in an amount sufficient to maintain the desired ratio of active mass to metal conductive network. For the nickel electrode a final ratio in the range of 1:2 to about 2:1 of active material to conductive network is preferred, and a ratio of about 1:1 is most preferred for obtaining the maximum capacity per unit volume of electrode.

The voltage required for uniform electrodeposition is preferably at least about 1.75 and more preferably at least about 2.0 volts. At the same time, it is preferred to pass at least about 800 coulombs per gram of active material through the electrode. For adequate nickel deposition a current of from about 8 to 12 amperes per cubic inch of electrode material is preferably required.

It should be understood that the optimum times, current and coulombs required to produce electrodes having the longest life and the greatest energy density can easily be found by those skilled in the art for each particular electrode to be subjected to the process according to the present invention.

Mechanical agitation, such as provided by ultrasonic treatment may be beneficial in promoting electrodeposition of the metal matrix.

(5) Examples

The following examples are set forth to illustrate the invention but not to limit it in any way.

EXAMPLES I–XIII

Four different sets of compressed powder nickel electrodes are constructed having the compositions (in weight percent) shown in Table I.

TABLE I

| Example number | Ni(OH)$_2$ | Graphite | Nickel powder | CdO | Reinforcing fiber |
|---|---|---|---|---|---|
| I–VII | 47.3 | 1.7 | 45.4 | 5.3 | 0.3 |
| VIII–IX | 55.7 | 2.0 | 36.5 | 5.5 | 0.3 |
| X–XI | 64.9 | 2.3 | 26.5 | 5.9 | 0.4 |
| XII–XIII | 75.3 | 2.7 | 15.2 | 6.4 | 0.4 |

The graphite is milled with the active nickel hydroxide powder until a porous coating of the graphite is formed on the active mass. The coated active mass is then blended with the conductive nickel powder, cadmium oxide as an anti-polar material, and a reinforcing fiber (Dynel) for reduction of spalling. The blend is then compacted under a pressure of about 65 tons/in.$^2$ upon an expanded mesh of nickel to form a self-supporting electrode shape having a nickel hydroxide content of about 0.6 gm. An electrical resistance measurement of the electrodes used in Ex. Nos. I–VII is made with an ohmmeter by contacting the electrodes with a $\frac{1}{16}$ inch diameter probe at 17 different points and averaging the values. The measurements gives resistances in the range of 3.5±0.5 ohms.

The thus formed electrodes are constrained by a screw clamp and each suspended as a cathode within an electrolyte medium. The electrolyte consists of equal parts of water and reagent grade ammonium hydroxide (containing 28 percent NH$_3$) and additionally contain 225 gm./liter dissolved ammonium bicarbonate. A counter electrode connected through a power source is immersed in the electrolyte medium and a steady state direct current of 200 milliamperes is passed through the system at a potential of 2.0 volts. In the examples shown in Table II finished electrode is then assembled along with cadmium anodes and separators into a flat plate cell which is cycled for 150 cycles (Examples VI–XIII) or 190 cycles (Examples I–V) and the discharge capacities in ampere-hours/in.$^3$ compared with the discharge capacity of the plate as computed after the second cycle.

The finished electrodes having the deposited nickel matrix are also compared microscopically for mechanical strength with commercially available positive nickel electrodes and heat sintered powder plaques and found to be nearly as strong.

(6) Modifications of the invention

The invention is capable of a variety of modifications and variations which will be made apparent to those skilled in the art by a reading of this specification. While description of the invention has concentrated on nickel electrodes, the invention is broadly applicable to a number of other electrodes, the details of which have been omitted for the sake of conciseness. All such modifications, variations and other equivalents are to be included within the scope of this invention as defined by the claims appended hereto.

What is claimed is:

1. A process for improving the electrochemical characteristics and electrical conductivity of an electrode comprising a mixture of electrochemically active positive mass selected from the group consisting of nickel hydrate, nickel hydroxide, manganese oxides, silver oxides and mercuric oxides and a finely divided conductive material affixed to a conductive support, said process comprising:
   (a) firmly compacting said mixture under a pressure of at least 6,000 p.s.i. upon said conductive support into a self supporting electrode shape;
   (b) suspending the electrode shape in a buffer-containing and complexing agent containing electrolyte medium whose constituents dissolve only a minor proportion of the available active mass of the electrode the pH of said electrolyte medium being maintained in the range of about 5.5 to about 12;
   (c) electrodepositing in situ at least a portion of said dissolved active mass as metal on and within the electrode shape to provide a conducting metal matrix forming a conductive link between said active mass and said conductive support.

2. The process of claim 1 wherein said active material is nickel hydroxide.

TABLE II

| Example number | Temp., °C. | Plate cycle on, sec. | Plate cycle off, sec. | Total time | Coulombs | Cycling | 2d cycle capacity | Capacity after cycling |
|---|---|---|---|---|---|---|---|---|
| I | 21 | 105 | 300 | 5 hrs., 50 mins | 1,000 | 190 | 4.2 | 3.8 |
| II | 21 | 105 | 300 | 8 hrs., 45 mins | 1,500 | 190 | 3.7 | 3.8 |
| III | 21 | 105 | 300 | 2 hrs., 55 mins | 500 | 190 | 5.6 | 3.5 |
| IV | 49 | 98 | 110 | 2 hrs., 55 mins | 1,000 | 190 | 4.1 | 2.7 |
| V | 49 | 98 | 72 | 2 hrs | 1,000 | 190 | 4.1 | 2.6 |
| VI | 49 | 68 | 72 | 1 hr., 26 mins | 500 | 190 | 4.3 | 4.0 |
| VII | 49 | 68 | 72 | 2 hrs., 52 mins | 1,000 | 150 | 4.0 | 3.4 |
| VIII | 49 | 68 | 72 | 2 hrs., 52 mins | 1,000 | 150 | 2.9 | 4.1 |
| IX | 49 | 68 | 72 | 1 hr., 26 mins | 500 | 150 | 4.1 | 4.7 |
| X | 49 | 68 | 72 | 2 hrs., 52 mins | 1,000 | 150 | 3.6 | 3.2 |
| XI | 49 | 68 | 72 | 1 hr., 26 mins | 500 | 150 | 4.6 | 3.6 |
| XII | 21 | 68 | 72 | 2 hrs., 52 mins | 1,000 | 150 | 4.4 | 4.5 |
| XIII | 21 | 68 | 72 | 1 hr., 26 mins | 500 | 150 | 5.4 | 4.2 | various on-off duty cycles are employed to strike a balance between the rate of dissolution of the nickel hydroxide and rate of nickel deposition. Much shorter on-off intervals (e.g. 3 seconds each) of interrupted direct current also yield satisfactory electrode plates.

As shown in Table II, the electrode plates are subjected to the electrodeposition cycle until from 500 to 1500 coulombs have passed through the electrode. As with the unprocessed compressed powder electrode, the same procedure is used to measure the resistivity of the finished electrode. The measurement of all the electrodes yields resistances in the range of 1.5±0.5 ohms, demonstrating the presence of the deposited nickel matrix. The 3. The process of claim 1 wherein said finely divided conductive material is selected from the group consisting of nickel powder and graphite.

4. The process of claim 1 wherein said compaction pressure is in the range of from about 10,000 p.s.i. up to the pressure required to reduce the porosity of the electrode to 10%.

5. The process of claim 1 wherein said electrolyte medium additionally comprises an anion to promote complex ion formation.

6. The process of claim 2 wherein the electrolyte medium comprises hydroxide ion as a buffering agent, ammonium ion as a complexing agent for nickel, and carbonate or bicarbonate anion to promote formation of nickel ammoniate complex.

7. The process of claim 2 wherein said electrolyte medium is substantially devoid of nickel ions which would preferentially plate on the surface of the electrode shape.

8. The process of claim 1 wherein electrodeposition is accomplished by utilizing a pulsed D.C. source of electric current.

9. The process of claim 8 wherein the current densities applied to the electrode shape ranges from about 8 to about 12 amperes per cubic inch of electrode material.

10. The process of claim 1 wherein said electrode mixture comprises a pasted mixture of said active mass, finely divided conductive material, and a binder all affixed to a conductive support and firmly compacted thereon.

11. The process of claim 1 wherein the electrode mixture comprises a powdered mixture of said active mass and finely divided metallic powder affixed to a conductive substrate in which said electrodeposition step joins together at least a portion of the finely divided metallic material to provide a conducting metal matrix.

12. The process of claim 1 wherein the pH of said electrolyte medium is maintained at a value of at least 9 by addition of said buffering agent.

13. The process of claim 12 wherein said electrolyte medium comprises a source of hydroxyl ions.

14. The process of claim 1 wherein the compaction pressure is at least about 30 tons/in.$^2$ of electrode surface.

15. The process of claim 1 wherein the compaction pressure is at least about 65 tons/in.$^2$ of electrode surface.

16. The process of claim 1 wherein said complexing agent contains ammonium ion.

References Cited

UNITED STATES PATENTS

| | | | |
|---|---|---|---|
| 3,316,159 | 4/1967 | Louzos | 204—23 |
| 3,317,347 | 5/1967 | Coleman et al. | 136—28 |
| 3,345,212 | 10/1967 | Schneitzer | 136—25 |
| 3,507,697 | 4/1970 | Korman | 136—29 |
| 3,305,401 | 2/1967 | Aulin | 136—120 |
| 3,455,741 | 7/1969 | Schneider | 136—76 |
| 2,616,939 | 11/1952 | Fischbach | 136—120 X |
| 3,214,297 | 10/1965 | Horn et al. | 136—29 |
| 3,230,113 | 1/1966 | Herold | 136—28 |
| 3,351,490 | 11/1967 | Von Doehren | 136—6 |

ANTHONY SKAPARS, Primary Examiner

U.S. Cl. X.R.

136—29, 75